(12) United States Patent
Yang et al.

(10) Patent No.: US 11,770,346 B2
(45) Date of Patent: Sep. 26, 2023

(54) MOBILE DEVICE-BASED DIGITAL WORK SYSTEM AND METHOD

(71) Applicant: Hangzhou Jindoutengyun Technologies Co., Ltd., Hangzhou (CN)

(72) Inventors: Yang Yang, Hangzhou (CN); Jie Ding, Hangzhou (CN)

(73) Assignee: Hangzhou Jindoutengyun Technologies Co., Ltd., Hangzhou (CN)

( * ) Notice: Subject to any disclaimer, the term of this patent is extended or adjusted under 35 U.S.C. 154(b) by 0 days.

(21) Appl. No.: 18/149,692

(22) Filed: Jan. 4, 2023

(65) Prior Publication Data
US 2023/0216808 A1 Jul. 6, 2023

(30) Foreign Application Priority Data
Jan. 6, 2022 (CN) .......................... 202210008098.X

(51) Int. Cl.
*H04L 47/70* (2022.01)
*H04L 67/75* (2022.01)
*H04L 67/52* (2022.01)

(52) U.S. Cl.
CPC .............. *H04L 47/70* (2013.01); *H04L 67/52* (2022.05); *H04L 67/75* (2022.05)

(58) Field of Classification Search
CPC .......... H04L 47/70; H04L 67/52; H04L 67/75
See application file for complete search history.

(56) References Cited

U.S. PATENT DOCUMENTS

| | | | |
|---|---|---|---|
| 10,187,757 B1 | 1/2019 | Thompson | |
| 2013/0042042 A1* | 2/2013 | Byrne | G06F 9/445 710/304 |
| 2020/0177596 A1* | 6/2020 | Grobelny | H04L 63/102 |
| 2020/0304543 A1* | 9/2020 | Hamlin | H04L 63/0876 |

FOREIGN PATENT DOCUMENTS

| | | |
|---|---|---|
| EP | 2515147 A2 | 10/2012 |
| WO | 2017114125 A1 | 7/2017 |

* cited by examiner

*Primary Examiner* — Joe Chacko
(74) *Attorney, Agent, or Firm* — PROI Intellectual Property US; Klaus Michael Schmid

(57) ABSTRACT

A mobile device-based digital work system comprises a dock and mobile device which are configured locally, and a network server configured in a network, wherein the dock is fixedly configured locally; the mobile device is in a communication connection with the dock and is equipped with a client capable of communicating with the network server; the client sends an identifier of the dock and user information input by a user to the network server on one hand, and sends a resource access request to the network server on the other hand; the network server returns corresponding work resources to the client according to the received identifier of the dock, the user information and a preset access policy, as a response to the resource access request. The granularity of management of the system can be improved, and management vulnerabilities are avoided to the maximum extent.

12 Claims, 1 Drawing Sheet

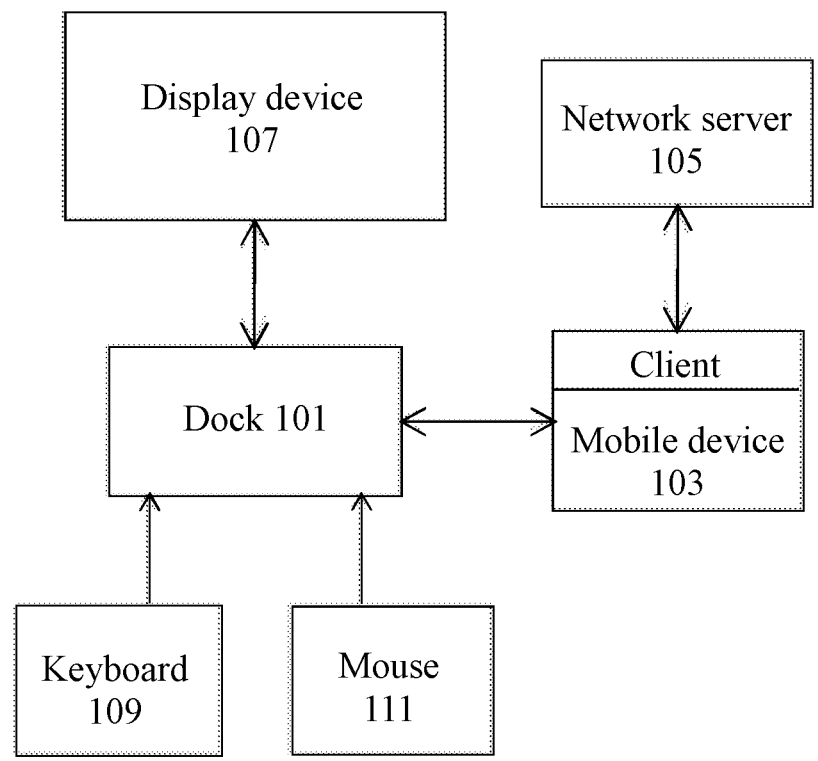

MOBILE DEVICE-BASED DIGITAL WORK SYSTEM AND METHOD

BACKGROUND OF THE INVENTION

1. Technical Field

The invention relates to a mobile device-based digital work system and method.

2. Description of Related Art

In the prior art, personal computers (PCs) are preferred by most enterprises for work. However, such a PC-based work scheme has the following problems: a, the PCs are independent of each other, and users install and update operating systems and software according their own requirements, which makes centralized management and control impossible; b, the PCs are completely controlled by users, so data leakage may be caused; c, the enterprises have to set up one PC for each user and handle subsequent maintenance, which leads to a high cost and makes it impossible to realize mobile work.

BRIEF SUMMARY OF THE INVENTION

In view of the aforementioned problems, one objective of the invention is to provide a mobile device-based digital work system.

The other objective of the invention is to provide a mobile device-based digital work method.

To fulfill the above objectives, the invention is implemented through the following technical solutions:

In one aspect of the invention, a mobile device-based digital work system comprises: a dock and a mobile device which are configured locally, and a network server configured in a network; wherein, The dock is fixedly configured locally;

The mobile device is in a communication connection with the dock and is equipped with a client capable of communicating with the network server; the client sends an identifier of the dock and user information input by a user to the network server on one hand, and sends a resource access request to the network server on the other hand;

The network server returns corresponding work resources to the client according to the received identifier of the dock, the user information and a preset access policy, as a response to the resource access request.

Preferably, the client sends the resource access request to the network server specifically as follows:

The client sends the resource access request to the network server after obtaining an address of the network server from the dock; after the mobile device is connected to the dock, the client runs to obtain the address of the network server from the dock (the address of the network server is stored in the dock), so the address of the network server does not need to be manually input, which makes using convenient; the address of the network server is not exposed to the user, so the security is further improved;

Or, the client sends the resource access request to the network server according to a preset address of the network server; after the mobile device is connected to the dock, the client runs to send the resource access request to the network server directly according to the address of the network server preset in the client, so the address of the network server does not need to be manually input, which makes using convenient; the address of the network server is not exposed to the user, so the security is further improved;

Or, the client sends the resource access request to the network server after the user inputs the address of the network server through the client, so the problem that the users cannot access corresponding work resources due to a failure to obtain the accurate address of the network server from the dock or due to tampering of the address of the network server preset in the client is solved, and the user can send the resource access request to the network server by inputting the address of the network server through the client.

Preferably, the work system further comprises a display device, which is in a communication connection with the dock and is used for displaying the work resources;

The client is also used for obtaining parameters of the display device and sending the parameters of the display device to the network server;

The network server returns the corresponding work resources to the client according to the received parameters of the display device, so as to match the display device to fulfill a better display effect.

Preferably, the work system further comprises a keyboard and a mouse which are in a communication connection with the dock, such that users can perform operations more conveniently.

In another aspect of the invention, a mobile device-based digital work system comprises: a dock and a mobile device which are configured locally, and a network server located in a network, wherein:

The dock is provided with a positioning module;

The mobile device is in a communication connection with the dock and is equipped with a client capable of communicating with the network server; the client sends an identifier and current position information of the dock and user information input by a user to the network server on one hand, and sends a resource access request to the network server on the other hand;

The network server returns corresponding work resources to the client according to the received identifier and current position information of the dock, the user information and a preset access policy, as a response to the resource access request.

Preferably, the client sends the resource access request to the network server specifically as follows:

The client sends the resource access request to the network server after obtaining an address of the network server from the dock; after the mobile device is connected to the dock, the client runs to obtain the address of the network server from the dock, so the address of the network server does not need to be manually input, which makes using convenient; the address of the network server is not exposed to the user the address of the network server, so the security is further improved;

Or, the client sends the resource access request to the network server according to a preset address of the network server; after the mobile device is connected to the dock, the client runs to send the resource access request to the network server directly according to the address of the network server preset in the client, so the address of the network server does not need to be manually input, which makes using convenient;

Or, the client sends the resource access request to the network server after the user inputs the address of the network server through the client, so the problem that the user cannot access corresponding work resources due to a failure to obtain the accurate address of the network server from the dock or due to tampering of the address of the network server preset in the client is solved, and the user can send the resource access request to the network server by inputting the address of the network server through the client.

Preferably, the work system further comprises a display device, which is in a communication connection with the dock and is used for displaying the work resources;

The client is also used for obtaining parameters of the display device and sending the parameters of the display device to the network server;

The network server returns the corresponding work resources to the client according to the received parameters of the display device, so as to match the display device to fulfill a better display effect.

Preferably, the work system further comprises a keyboard and a mouse which are in a communication connection with the dock, such that users can perform operations more conveniently.

In another aspect of the invention, a mobile device-based digital work method comprises:

Obtaining, by a client installed on a mobile device, an identifier of a dock which is fixedly configured locally and is connected to the mobile device;

Sending the identifier of the dock and user information input by a user to a network server;

Sending a resource access request to the network server; and

Returning, by the network server, corresponding work resources to the client according to the received identifier of the dock, the user information and a preset access policy, as a response to the resource access request.

Preferably, sending a resource access request to the network server specifically comprises:

Sending the resource access request to the network server after the client obtains an address of the network server from the dock, wherein after the mobile device is connected to the dock, the client runs to obtain the address of the network server from the dock, so the address of the network server does not need to be manually input, which makes using convenient; the address of the network server is not exposed to the user, so the security is further improved;

Or, sending the resource access request to the network server by the client according to a preset address of the network server, wherein after the mobile device is connected to the dock, the client runs to send the resource access request to the network server directly according to the address of the network server preset in the client, so the address of the network server does not need to be manually input, which makes using convenient;

Or, sending the resource access request to the network server after the user inputs the address of the network server through the client, wherein in order to solve the problem that the user cannot access corresponding work resources due to a failure to obtain the accurate address of the network server from the dock or due to tampering of the address of the network server preset in the client, the user can send the resource access request to the network server by inputting the address of the network server through the client.

Preferably, the dock is in a communication connection with a display device used for displaying the work resources;

The client obtains parameters of the display device and sends the parameters of the display device to the network server;

The network server returns the corresponding work resources to the client according to the received parameters of the display device, so as to match the display device to fulfill a better display effect.

Preferably, the dock is in a communication connection with a keyboard and a mouse, such that users can perform operations more conveniently.

In another aspect of the invention, a mobile device-based digital work method comprises:

Obtaining, by a client installed on a mobile device, an identifier and current position information of a dock which is fixedly configured locally and is connected to the mobile device;

Sending the identifier and current position information of the dock and user information input by a user to a network server;

Sending a resource access request to the network server; and

Returning, by the network server, corresponding work resources to the client according to the received identifier and current position information of the dock, the user information and a preset access policy, as a response to the resource access request.

Preferably, sending a resource access request to the network server specifically comprises:

Sending the resource access request to the network server after the client obtains an address of the network server from the dock, wherein after the mobile device is connected to the dock, the client runs to obtain the address of the network server from the dock, so the address of the network server does not need to be manually input, which makes using convenient; the address of the network server is not exposed to the user, so the security is further improved;

Or, sending the resource access request to the network server by the client according to a preset address of the network server, wherein after the mobile device is connected to the dock, the client runs to send the resource access request to the network server directly according to the address of the network server preset in the client, so the address of the network server does not need to be manually input, which makes using convenient;

Or, sending the resource access request to the network server after the user inputs the address of the network server through the client, wherein in order to solve the problem that the user cannot access corresponding work resources due to a failure to obtain the accurate address of the network server from the dock or due to tampering of the address of the network server preset in the client, the user can send the resource access request to the network server by inputting the address of the network server through the client.

Preferably, the dock is in a communication connection with a display device used for displaying the work resources;

The client obtains parameters of the display device and sends the parameters of the display device to the network server;

The network server returns the corresponding work resources according to the received parameters of the display device, to match the display device so as to fulfill a better display effect.

Preferably, the dock is in a communication connection with a keyboard and a mouse, such that users can perform operations more conveniently.

The invention has the following beneficial effects:

1. According to the invention, the dock is configured locally and is used as an anchor point of the mobile device, such that the current position of the mobile device can be obtained accurately, and the problem that, in the prior art, position information is obtained relying on a mobile device, thus resources can be illegally acquired by faking or tampering with the current position information of the mobile device is solved (for example, the device can obtain resources A, B and C at position X, and can only obtain resource A at position Y; because the position information is provided relying on the device itself, the position information of the device may be faked or tampered to position X when the device is actually located at position Y, and in this case, the device can obtain resources A, B and C), the granularity of management of the system is improved, and management vulnerabilities are avoided to the maximum extent.

2. After the mobile device is connected to the dock, the client runs to obtain the address of the network server from the dock, so the address of the network server does not need to be manually input, which makes using convenient; in addition, users will not be exposed to the address of the network server, so the security is further improved.

3. The mobile device is directly used for work, no PC is needed, maintenance is not needed, and installation and updating of operating systems and software are avoided, so the cost is low, and using is convenient.

4. Work resources are provided by the network server according to the permissions of users, so virus attacks and data leakage are unlikely to occur.

5. The network server provides resources according to the identity of users and the current state (whether or not the network server is connected to the dock, the identifier of the dock to which the network server is connected, the current position of the dock, and the like), such that finer management and control are realized.

BRIEF DESCRIPTION OF THE SEVERAL VIEWS OF THE DRAWINGS

FIG. 1 is a structural diagram of a work system according to the invention.

DETAILED DESCRIPTION OF THE INVENTION

To better clarify the purposes, technical solutions and advantages of the embodiments of the invention, the technical solutions of the embodiments of the invention will be clearly and completely described. Obviously, the embodiments in the following description are merely illustrative ones, and are not all possible ones of the invention. All other embodiments obtained by those ordinarily skilled in the art according to the following ones without creative labor should also fall within the protection scope of the invention.

More and more workers use mobile devices for remote or mobile work. However, due to the reasons in management, legality and security, workers still have to carry out part of work at a fixed position or in a designated area, where the workers can obtain relevant work resources.

In addition, because mobile devices are controlled by users, users may obtain resources beyond their permissions by faking or tampering current position information of the mobile devices obtained relying on these mobile devices. For example, the mobile device can obtain resources A, B and C at position X, and can only obtain resource A at position Y; because the position information is provided relying on the mobile device itself, the position information of the mobile device may be faked or tampered with to position X when the device is actually located at position Y, and in this case, the mobile device can obtain resources A, B and C. For example, all intelligent attendance systems on the preset market work as follows: only when the mobile device of users is located within a specific area, the users can sign in through the mobile device. However, in actual application, because the intelligent attendance systems work based on position information provided by the mobile device, a user can sign in by faking or tampering with the current position information provided by the mobile device even if the user and the mobile device carried by the user do not enter the specific area, leading to management vulnerabilities.

In view of the above technical problems, the invention provides a mobile device-based digital work system. According to the mobile device-based digital work system, a dock is configured locally and is used as an anchor point of a mobile device, such that the fixed position of the mobile device in the dock can be determined or the current position of the mobile device can be obtained accurately through the dock, and the problem that, in the prior art, the position information is obtained relying on the mobile device, so resources beyond permission can be acquired by faking or tampering with the current position information of the mobile device is solved, the granularity of management and accuracy of the system are improved, and management vulnerabilities are avoided to the maximum extent. In addition, a network server provides resources according to the identity of users and the current state (whether or not the network server is connected to the dock, the identifier of the dock to which the network server is connected, the current position of the dock, and the like), such that management and control with finer granularity are realized.

As shown in FIG. 1, this embodiment provides a mobile device-based digital work system, comprising: a dock 101 and a mobile device 103 which are configured locally, and a network server 105 configured in a network, wherein the network server 105 may be located in a local network or in the cloud.

The dock 101 is fixedly configured locally. For example, the dock 101 is fixedly installed at the working position of each worker. Preferably, a holding socket for placing the mobile device 103 may be equipped on the dock 101, and after being placed at the holding socket, the mobile device 103 establishes a communication connection with the dock 101. Specifically, a connector used for establishing a communication connection with the mobile device 103, such as a Type-C connector or a Lightning connector is installed at the holding socket.

The mobile device 103 is in a communication connection with the dock 101, and is equipped with a client capable of communicating with the network server 105 (the client is a mobile application/APP or a system module). Specifically, the mobile device 103 may be a smart mobile device such as a mobile phone or a tablet computer, and is connected to the dock 101 through a USB, Type-C connector or a Lightning connector. The client sends an identifier of the dock 101 and user information input by a user to the network server 105 on one hand, and sends a resource access request to the network server 105 on the other hand. Wherein, the identifier of the dock 101 is an ID representing the unique identity of the dock 101; and the user information comprises at least one of a user name, a group to which the user belongs, a department to which the user belongs, or the level of the user.

The network server 105 returns corresponding work-related resources such as data, documents, applications and services to the client according to the received identifier of the dock 101, the user information and a preset access policy, as a response to the resource access request. Specifically, the network server 105 performs identity verification according to received information, determines a permission scope of the user according to the received user information after the user passes the identity verification, and determines work resources (not beyond the permission scope) to be returned to the client according to the identifier of the dock 101. That is, the network server 105 provides resources according to information and current state (whether being connected to the dock, the identifier of the dock, and the like) of the user, such that management and control of finer granularity are realized.

For the sake of a good understanding, an example will be given below.

The access policy of the network server 105 may be set as follows:

1. The network server 105 can provide resource aa, resource ab, resource ac, resource ad and resource ae related to the work of the user.

2. If a user with user name A logs in the client through a mobile device A1 (identifier of the mobile device) and the identifier of the dock 101 connected to the mobile device A1 is A2, the user with user name A is allowed to access resource aa, resource ab, resource ac, resource ad and resource ae. Only when the identifier of the dock received by the network server 105 is A2, the network server 105 determines resource aa, resource ab, resource ac, resource ad and resource ae as work resources to be returned to the client (in this case, the user with user name A logs in the client). That is, the user can obtain the most resources within his/her permission scope by accessing the network server 105 after connecting the mobile device to the corresponding dock and inputting the corresponding user name.

3. If the user with user name A logs in the client through the mobile device A1 and the identifier of the dock 101 connected to the mobile device A1 is not A2, the user with user name A is allowed to access part of resource aa, resource ab, resource ac, resource ad and resource ae. For example, the user with user name A is allowed to access resource aa, resource ab and resource ac, and is not allowed to access resource ad and resource ae. When the identifier of the dock received by the network server 105 is not A2, the network server 105 determines only part of the resources (such as resource aa, resource ab and resource ac) as work resources to be returned to the client (in this case, the user with user name A logs in the client).

In this embodiment, the user name and the identifier of the dock are used as basic elements of the access policy, and other parameters such as the identifier of the mobile device, the group to which the user belongs, the department to which the user belongs, the level of the user, and the access time can also be added to serve as the basic elements of the access policy as needed.

Optionally, those skilled in the art may also set the following strategy: if the network server 105 receives the resource access request initialized by the user, and does not receive the identifier of any dock, part of the resources within the permission scope corresponding to the user information are returned to the client. For example, the user can only view some of the resources, but cannot edit or delete them.

As one preferred implementation of this embodiment, the client sends the resource access request to the network server 105 through the following solutions:

The client sends the resource access request to the network server 105 after obtaining an address of the network server 105 from the dock 101; after the mobile device 103 is connected to the dock 101, the client runs to obtain the address of the network server 105 from the dock 101 (the address of the network server is stored in the dock), so the address of the network server does not need to be manually input, which making using convenient; in addition, the address of the network server 105 is not exposed to the user, so the security is further improved.

The client sends the resource access request to the network server 105 according to a preset address of the network server 105; after the mobile device 103 is connected to the dock 101, the client runs to send the resource access request to the network server 105 directly according to the address of the network server preset therein, the address of the network server does not need to be manually input, so using is convenient; the address of the network server 105 is not exposed to the user, so the security is further improved;

The client sends the resource access request to the network server 105 after the user inputs the address of the network server 105 to the client; in order to solve the problem that the user cannot access corresponding work resources due to a failure to obtain the accurate address of the network server 105 from the dock 101 or due to tampering of the address of the network server preset in the client, the user can send the resource access request to the network server 105 by inputting the address of the network server 105 through the client.

As another preferred implementation of this embodiment, the mobile device-based digital work system further comprises:

A display device 107 which is in communication connection with the dock 101 and is used for displaying the work resources, wherein the display device 107 may be a smart device such as a computer display, a television, an AR helmet or AR glasses, and is connected to the dock 101 through an HDMI, USB Type-C or Lightning cable;

The client is also used for obtaining parameters of the display device 107 and sending the parameters of the display device 107 to the network server 105;

The network server 105 returns the corresponding work resources to the client according to the received parameters of the display device 107, so as to match the display device 107 to fulfill a better display effect.

To provide better work experience for users, the work system further comprises a keyboard 109 and a mouse 111 which are in a communication connection with the dock 101. In this embodiment, the keyboard 109 and the mouse 111 are connected to the dock 101 through a USB port.

This embodiment further provides a mobile device-based digital work method, which specifically comprises:

Obtaining, by a client installed on a mobile device 103, an identifier of a dock 101 which is fixedly configured locally and is connected to the mobile device 103;

Sending the identifier of the dock 101 and user information input by a user to the network server 105;

Sending a resource access request to the network server 105 by the client, wherein the specific implementation of this step has been clearly expounded above and will no longer be detailed here;

Returning, by the network server 105, corresponding work-related resources such as data, documents, applications and services to the client according to the received identifier of the dock 101, the user information and a preset access policy, as a response to the resource access request. Specifically, the network server 105 performs identity verification according to received information, determines a permission scope of the user according to the received user information after the user passes the identity verification, and determines work resources (not beyond the permission scope) to be returned to the client according to the identifier of the dock 101. After obtaining the work resources through the client, the user can view, edit and confirm these work resources to fulfill needs from work.

To further improve the granularity of management, the digital work system in this embodiment may adopt the following solutions:

The mobile device-based digital work system comprises: a dock 101 and a mobile device 103 which are configured locally, and a network server 105 configured in a network; the network server 105 may be located in a local network or in the cloud.

The dock 101 is provided with a positioning module, such as a GPS module used for acquiring current position information of the dock 101. Preferably, a holding socket for placing the mobile device 103 may be equipped on the dock 101, and after being placed at the holding socket, the mobile device 103 establishes a communication connection with the dock 101. Specifically, a connector used for establishing a communication connection with the mobile device 103, such as a Type-C connector or a Lightning connector is installed at the holding socket.

The mobile device 103 is in a communication connection with the dock 101, and is equipped with a client capable of communicating with the network server 105 (the client is a mobile application/APP or a system module). Specifically, the mobile device 103 may be a smart mobile device such as a mobile phone or a tablet computer, and is connected to the dock 101 through a USB, Type-C connector or a Lightning connector. The client sends an identifier and current position information of the dock 101 and user information input by a user to the network server 105 on one hand, and sends a resource access request to the network server 105 on the other hand (which has been clearly expounded above and will no longer be detailed here). Wherein, the identifier of the dock 101 is an ID representing the unique identity of the dock 101; and the user information comprises at least one of a user name, a group to which the user belongs, a department to which the user belongs, or the level of the user.

The network server 105 returns corresponding work-related resources such as data, documents, applications and services to the client according to the received identifier and current position information of the dock 101, the user information and a preset access policy, as a response to the resource access request. Specifically, the network server 105 performs identity verification according to received information, determines a permission scope of the user according to the received user information after the user passes the identity verification, and determines work resources (not beyond the permission scope) to be returned to the client according to the identifier and current position information of the dock 101. That is, the network server 105 provides resources according to information and current state (whether being connected to the dock, the identifier of the dock, the current position information of the dock, and the like) of the user, such that finer management and control are realized.

In this system, there are three cases in term of the dock 101: the movable device 103 is not connected to the dock 101; the mobile device 103 is connected to the dock 101, and the current position information of the dock (acquired by the a positioning module) is consistent with position information of the dock prestored in the network server 105; the mobile device 103 is connected to the dock 101, and the current position information of the dock (acquired by the positioning module) is not consistent with the position information of the dock prestored in the network server 105. In this way, the granularity of management is further improved.

For the sake of a good understanding, an example will be given below.

The preset access policy of the network server 105 may be set as follows:

1. The network server 105 can provide resource ba, resource bb, resource bc, resource bd and resource be related to the work of the user.

2. If a user with user name B logs in the client through a mobile device B1 (identifier of the mobile device), the identifier of the dock 101 connected to the mobile device B1 is B2, and the current position information of the dock (acquired by the positioning module) is consistent with the position information of the dock, with the identifier B2, prestored in the network server 105, the user with user name B is allowed to access resource ba, resource bb, resource bc, resource bd and resource be. Only when the identifier of the dock received by the network server 105 is B2 and the current position information of the dock (acquired by the positioning module) is consistent with the position information of the dock, with the identifier B2, prestored in the network server 105, the network server 105 determines resource ba, resource bb, resource bc, resource bd and resource be as work resources to be returned to the client (in this case, the user with user name B logs in the client).

3. If the user with user name B logs in the client through the mobile device B1, the identifier of the dock 101 connected to the mobile device B1 is B2, and the current position information of the dock (acquired by the positioning module) is not consistent with the position information of the dock, with the identifier B2, prestored in the network server 105, the user with user name B is allowed to access part of resource ba, resource bb, resource bc, resource bd and resource be. For example, the user with user name B is allowed to access resource ba, resource bb and resource bc, and is not allowed to access resource bd and resource be.

4. If the user with user name B logs in the client through the mobile device B1, the identifier of the dock 101 connected to the mobile device B1 is not B2, and the current position information of the dock (acquired by the positioning module) is consistent with the position information of the dock, with the identifier B2, prestored in the network server 105, the user with user name B is allowed to access part of resource ba, resource bb, resource bc, resource bd and resource be. For example, the user with user name B is allowed to access resource ba, resource bb and resource bc, and is not allowed to access resource bd and resource be.

5. If the user with user name B logs in the client through the mobile device B1, the identifier of the dock 101 connected to the mobile device B1 is not B2, and the current position information of the dock (acquired by the positioning module) is not consistent with the position information of the dock, with the identifier B2, prestored in the network server 105, the user with user name B is allowed to access part of resource ba, resource bb, resource bc, resource bd and resource be. For example, the user with user name B is allowed to access resource ba, and is not allowed to access resource bb, resource bc, resource bd and resource be.

In this embodiment, the user name, the identifier of the dock and the current position information of the dock are used as basic elements of the access policy, and other parameters such as the identifier of the mobile device, the group to which the user belongs, the department to which the user belongs, the level of the user, and the access time can also be added to serve as the basic elements of the access policy as needed.

Optionally, those skilled in the art may also set the following strategy: if the network server 105 receives the resource access request initialized by the user, and does not receive the identifier of any dock, part of the resources within the permission scope corresponding to the user information are returned to the client. For example, the user can only view part of the resources, but cannot edit or delete them.

As another preferred implementation of this embodiment, the mobile device-based digital work system further comprises:

A display device 107 which is in communication connection with the dock 101 and is used for displaying the work resources, wherein the display device 107 may be a smart device such as a computer display, a television, an AR helmet or AR glasses, and is connected to the dock 101 through an HDMI, USB Type-C or Lightning cable;

The client is also used for obtaining parameters of the display device 107 and sending the parameters of the display device 107 to the network server 105;

The network server 105 returns the corresponding work resources to the client according to the received parameters of the display device 107, so as to match the display device 107 to fulfill a better display effect.

To provide better work experience for users, the work system further comprises a keyboard 109 and a mouse 111 which are in a communication connection with the dock 101. In this embodiment, the keyboard 109 and the mouse 111 are connected to the dock 101 through a USB port.

To further improve the granularity of management, this embodiment further provide another mobile device-based digital work method, comprising:

Obtaining, by a client installed on a mobile device 103, an identifier and current position information of a dock 101 which is fixedly configured locally and is connected to the mobile device;

Sending the identifier and current position information of the dock 101 and user information by a user to a network server 105;

Sending a resource access request to the network server 105, wherein the specific implementation of this step has been clearly expounded above and will no longer be detailed here;

Returning, by the network server 105, corresponding work-related resources such as data, documents, applications and services to the client according to the received identifier and current position information of the dock 101, the user information and a preset access policy, as a response to the resource access request. Specifically, the network server 105 performs identity verification according to received information, determines a permission scope of the user according to the received user information after the user passes the identity verification, and determines work resources (not beyond the permission scope) to be returned to the client according to the identifier and current position information of the dock 101. After obtaining the work resources through the client, the user can browse, amend and confirm these work resources to meet their work requirements.

The examples of the above implementations are merely used to further assist in understanding the solutions of the invention, and are not intended to limit the technical solutions of the invention. Although the invention has been explained in detail with reference to the above embodiments, those ordinarily skilled in the art should understand that the technical solutions recorded in the above embodiments can be modified, or part of the technical features in these embodiments can be equivalently substituted, without making the essences of the corresponding technical solutions depart from the scope of the technical solutions of the embodiments of the invention.

What is claimed is:

1. A mobile device-based digital work system, comprising a dock and a mobile device which are configured locally, and a network server configured in a network; wherein, the dock is fixedly configured and installed in a local position;

the mobile device is in a communication connection with the dock and is equipped with a client capable of communicating with the network server; the client sends an identifier of the dock and user information input by a user to the network server on one hand, and sends a resource access request to the network server on the other hand;

the network server returns corresponding work resources to the client according to the received identifier of the dock, the user information and a preset access policy, as a response to the resource access request, wherein, the network server uses the identifier of the dock as basic elements to determine work resources returned to the client.

2. The mobile device-based digital work system according to claim 1, wherein the client sends the resource access request to the network server specifically as follows:

the client sends the resource access request to the network server after obtaining an address of the network server from the dock;

or, the client sends the resource access request to the network server according to a preset address of the network server;

or, the client sends the resource access request to the network server after the user inputs the address of the network server through the client.

3. The mobile device-based digital work system according to claim 1, wherein the work system further comprises a display device, which is in a communication connection with the dock and is used for displaying the work resources;

the client is also used for obtaining parameters of the display device and sending the parameters of the display device to the network server.

4. The mobile device-based digital work system according to claim 1, wherein the work system further comprises a keyboard and a mouse which are in a communication connection with the dock.

5. A mobile device-based digital work system, comprising a dock and a mobile device which are configured locally, and a network server located in a network, wherein:

the dock is provided with a positioning module;

the mobile device is in a communication connection with the dock and is equipped with a client capable of communicating with the network server; the client sends an identifier and current position information of the dock and user information input by a user to the network server on one hand, and sends a resource access request to the network server on the other hand;

the network server returns corresponding work resources to the client according to the received identifier and current position information of the dock, the user information and a preset access policy, as a response to the resource access request, wherein, the network server uses the identifier of the dock and the current position information of the dock as basic elements to determine work resources returned to the client.

6. The mobile device-based digital work system according to claim 5, wherein the client sends a resource access request to the network server specifically as follows:
the client sends the resource access request to the network server after obtaining an address of the network server from the dock;
or, the client sends the resource access request to the network server according to a preset address of the network server;
or, the client sends the resource access request to the network server after the user inputs the address of the network server through the client.

7. The mobile device-based digital work system according to claim 5, wherein the work system further comprises a display device, which is in a communication connection with the dock and is used for displaying the work resources;
the client is also used for obtaining parameters of the display device and sending the parameters of the display device to the network server.

8. The mobile device-based digital work system according to claim 5, wherein the work system further comprises a keyboard and a mouse which are in a communication connection with the dock.

9. A mobile device-based digital work method, comprising:
obtaining, by a client installed on a mobile device, an identifier of a dock which is fixedly configured locally and is connected to the mobile device;
sending the identifier of the dock and user information input by a user to a network server;
sending a resource access request to the network server; and
returning, by the network server, corresponding work resources to the client according to the received identifier of the dock, the user information and a preset access policy, as a response to the resource access request, wherein, the network server uses the identifier of the dock as basic elements to determine work resources returned to the client.

10. The mobile device-based digital work method according to claim 9, wherein sending a resource access request to the network server specifically comprises:
sending the resource access request to the network server after the client obtains an address of the network server from the dock;
or, sending the resource access request to the network server by the client according to a preset address of the network server;
or, sending the resource access request to the network server after the user inputs the address of the network server through the client.

11. A mobile device-based digital work method, comprising:
obtaining, by a client installed on a mobile device, an identifier and current position information of a dock which is fixedly configured locally and is connected to the mobile device;
sending the identifier and current position information of the dock and user information input by a user to a network server;
sending a resource access request to the network server; and
returning, by the network server, corresponding work resources to the client according to the received identifier and current position information of the dock, the user information and a preset access policy, as a response to the resource access request, wherein, the network server uses the identifier of the dock and the current position information of the dock as basic elements to determine work resources returned to the client.

12. The mobile device-based digital work method according to claim 11, wherein sending a resource access request to the network server specifically comprises:
sending the resource access request to the network server after the client obtains an address of the network server from the dock;
or, sending the resource access request to the network server by the client according to a preset address of the network server;
or, sending the resource access request to the network server after the user inputs the address of the network server through the client.

* * * * *